US007546709B2

(12) United States Patent
Jaster et al.

(10) Patent No.: US 7,546,709 B2
(45) Date of Patent: Jun. 16, 2009

(54) TUBULAR SKYLIGHT DOME WITH VARIABLE PRISM

(75) Inventors: Paul Jaster, Carlsbad, CA (US); John Futhey, Santa Rosa, CA (US)

(73) Assignee: Solatube International, Inc., Vista, CA (US)

( * ) Notice: Subject to any disclaimer, the term of this patent is extended or adjusted under 35 U.S.C. 154(b) by 499 days.

(21) Appl. No.: 11/242,460

(22) Filed: Oct. 3, 2005

(65) Prior Publication Data

US 2007/0074468 A1 Apr. 5, 2007

(51) Int. Cl.
*E04B 7/18* (2006.01)
*G02B 17/00* (2006.01)
*G02B 3/08* (2006.01)

(52) U.S. Cl. ......................... 52/200; 359/591; 359/743; 362/1; 362/2; 362/145

(58) Field of Classification Search ................... 52/200; 362/335, 337–340, 145, 147; 359/591, 592, 359/598, 743
See application file for complete search history.

(56) References Cited

U.S. PATENT DOCUMENTS

| | | | | | |
|---|---|---|---|---|---|
| 191,802 | A | * | 6/1877 | Howard | 52/200 |
| 376,649 | A | * | 1/1888 | Haldeman | 359/598 |
| 1,504,970 | A | * | 8/1924 | Pascucci | 359/743 |
| 1,955,601 | A | * | 4/1934 | Lamblin-Parent | 362/337 |
| 2,015,235 | A | * | 9/1935 | Rolph | 362/340 |
| 2,566,126 | A | * | 8/1951 | Franck | 362/309 |
| 2,740,903 | A | * | 4/1956 | Willcox | 250/237 R |
| 2,751,816 | A | * | 6/1956 | Strong | 359/853 |
| 2,831,394 | A | * | 4/1958 | Heenan et al. | 340/815.76 |
| 2,858,734 | A | * | 11/1958 | Boyd | 359/593 |
| 2,993,409 | A | | 7/1961 | Boyd | |
| 3,307,303 | A | * | 3/1967 | Bloxsom | 52/200 |
| 3,435,203 | A | * | 3/1969 | Reading | 362/337 |
| 3,523,721 | A | * | 8/1970 | Hofmann | 359/743 |
| 3,572,903 | A | * | 3/1971 | Hofmann | 359/743 |
| 3,679,294 | A | * | 7/1972 | Hofmann et al. | 359/743 |
| D226,395 | S | * | 2/1973 | Dorman | D26/123 |
| 3,735,685 | A | * | 5/1973 | Plummer | 396/152 |
| 3,744,391 | A | * | 7/1973 | Plummer | 396/152 |
| 3,948,660 | A | * | 4/1976 | Deml et al. | 430/290 |
| 4,069,812 | A | * | 1/1978 | O'Neill | 136/246 |
| 4,263,641 | A | * | 4/1981 | Ferrero | 362/293 |
| 4,371,916 | A | * | 2/1983 | De Martino | 362/511 |
| 4,389,085 | A | * | 6/1983 | Mori | 359/591 |
| 4,519,675 | A | * | 5/1985 | Bar-Yonah | 359/595 |
| 4,839,781 | A | * | 6/1989 | Barnes et al. | 362/299 |
| 5,099,622 | A | | 3/1992 | Sutton | 52/200 |
| 5,228,772 | A | * | 7/1993 | Mitchell et al. | 362/183 |
| 5,416,684 | A | * | 5/1995 | Pearce | 362/340 |
| 5,467,564 | A | | 11/1995 | DeKeyser et al. | 52/173 |

(Continued)

*Primary Examiner*—Robert J Canfield
*Assistant Examiner*—Charissa Ahmad
(74) *Attorney, Agent, or Firm*—John L. Rogitz

(57) ABSTRACT

The inside surface of a cover for a skylight is molded to have a variable prism that directs low-angle light into the skylight tube and that reflects away some high-angle light, to achieve a more constant light output over the course of the day. The prism is established by a series of circular parallel grooves, with grooves nearer the apex of the cover having cross-sections that are different than the cross-sections of grooves nearer the periphery of the cover.

18 Claims, 3 Drawing Sheets

U.S. PATENT DOCUMENTS 5,493,824 A 2/1996 Webster et al. ................ 52/200
5,502,935 A 4/1996 Demmer ...................... 52/200
5,546,712 A 8/1996 Bixby ......................... 52/200
5,551,042 A * 8/1996 Lea et al. .................... 359/742
5,578,139 A * 11/1996 Jones et al. ................. 136/245
5,596,848 A 1/1997 Lynch ......................... 52/200
5,648,873 A * 7/1997 Jaster et al. ................. 359/591
D382,347 S 8/1997 Grubb ......................... D25/52
5,655,339 A * 8/1997 DeBlock et al. ............... 52/200
D389,254 S 1/1998 Grubb ....................... D25/199
5,878,539 A 3/1999 Grubb ......................... 52/200
5,896,712 A * 4/1999 Chao ........................... 52/200
5,896,713 A 4/1999 Chao et al. .................... 52/200
5,983,581 A * 11/1999 DeBlock et al. ............... 52/200
RE36,496 E 1/2000 Sutton ......................... 52/200
6,035,593 A 3/2000 Chao et al. .................... 52/200
6,179,443 B1 * 1/2001 Weber ........................ 362/255
6,219,977 B1 * 4/2001 Chao et al. .................... 52/200
6,256,947 B1 7/2001 Grubb ......................... 52/200
6,305,830 B1 * 10/2001 Zwick et al. ................ 362/520
6,321,493 B1 11/2001 Rillie et al. ................... 52/200
RE38,217 E * 8/2003 DeBlock et al. ............... 52/200
6,724,535 B1 * 4/2004 Clabburn .................... 359/619
7,146,768 B2 * 12/2006 Rillie .......................... 52/200
7,185,464 B2 * 3/2007 Bracale ....................... 52/200
7,251,084 B2 * 7/2007 Shimura ..................... 359/742
7,322,156 B1 * 1/2008 Rillie et al. ................... 52/200
2003/0061775 A1 * 4/2003 Rillie .......................... 52/200
2003/0079422 A1 * 5/2003 Bracale ....................... 52/200
2005/0078483 A1 * 4/2005 Bernard et al. .............. 362/327
2005/0166490 A1 * 8/2005 Darmer et al. ................ 52/200

* cited by examiner

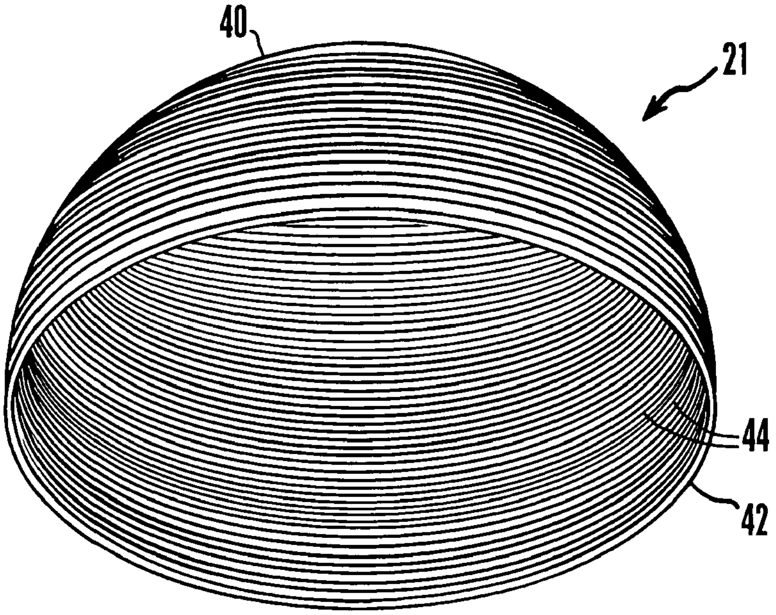
Figure 2
Figure 3
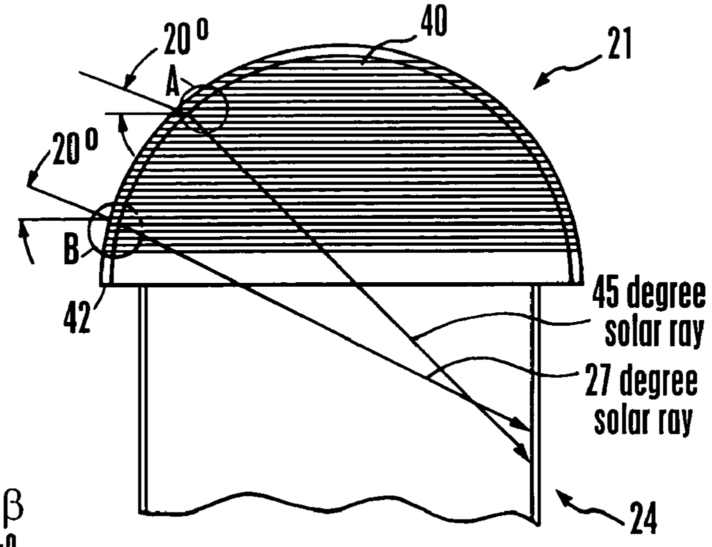
Figure 4
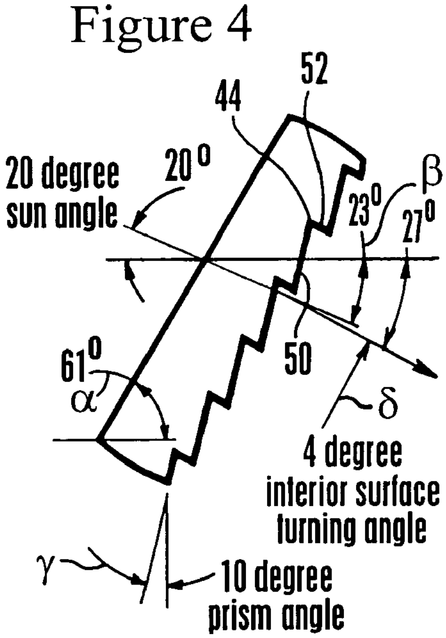
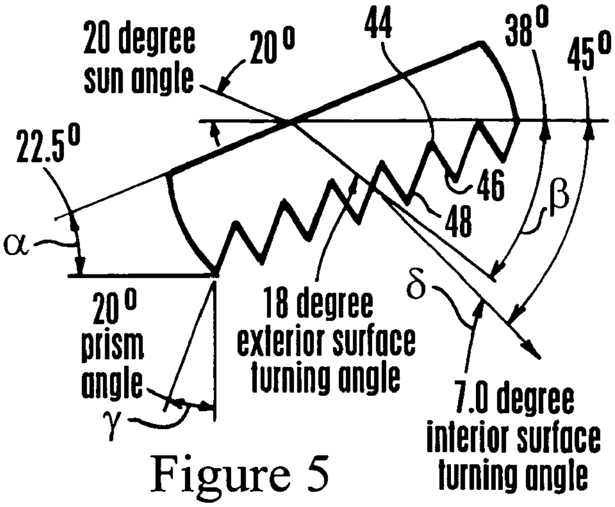
Figure 5

TUBULAR SKYLIGHT DOME WITH VARIABLE PRISM

FIELD OF THE INVENTION

The present invention relates to skylights.

BACKGROUND OF THE INVENTION

Skylights are used to illuminate buildings in a pleasing and energy-conserving way. Tubular skylights such as those made by the present assignee typically have a roof-mounted transparent cover or dome, a light conveying tube assembly extending down from the dome into the building to a ceiling, and a light diffuser plate covering the bottom of the tube at the ceiling. An example of a commercially successful tubular skylight is disclosed in U.S. Pat. No. 5,099,622, assigned to the same assignee as the present invention and incorporated herein by reference. Other patents owned by the present assignee that pertain to various skylight technologies are disclosed in U.S. Pat. Nos. RE36,496 (dome with reflector), 6,219,977 (round-to-square adapter), and 5,896,712 (dome with circular grooves), all of which are incorporated herein by reference.

As recognized herein, a difficult goal of skylight design is the provision of as constant a light output as possible regardless of the time of day. This is difficult to achieve because in the mornings and evenings the sun is at a low angle and less light enters the skylight than at midday, when the sun is at a high angle. Indeed, in designing a skylight to maximize light collection and throughput during the morning and evenings hours, the resulting skylight can over-illuminate a room at midday, with so-called "hotspots" (areas in the room where light from the skylight undesirably might be focused) being particularly noticeable at midday. Thus, the present invention recognizes the desirability of achieving a more constant light output regardless of time of day, as well as the desirability of mixing light sufficiently as it propagates down the tube into the room to avoid "hotspots". With these critical recognitions in mind, the invention herein is provided.

SUMMARY OF THE INVENTION

A tubular skylight includes a transparent dome and a skylight tube depending downwardly from the dome. The cover is formed with a variable prism that directs low-angle light into the skylight tube and that reflects away some high-angle light, to achieve a more constant light output over the course of the day.

In some embodiments the prism is established by a series of circular parallel grooves, with grooves nearer an apex of the cover having cross-sections that are different than cross-sections of grooves nearer a periphery of the cover. The grooves can be molded into the inside surface of the cover. Non-prism portions of the cover, such as its outer surface, refract light at a first angle and the prism refracts light at a second angle different from the first angle.

With greater specificity as to the non-limiting embodiments, the cross-section of at least one groove nearer the apex defines successive faces of approximately the same length, whereas the cross-section of at least one groove nearer the periphery defines successive long and short faces. The short faces can be oriented generally perpendicularly to the outer surface of the cover. If desired, an inside edge of a bottom periphery of the cover may be radially spaced from an outside surface of the tube.

In another aspect, a lighting system includes a transparent skylight cover, a light diffuser, and a tubular structure extendable between the cover and diffuser. The cover is formed with a first pair of prism faces and a second pair of prism faces having a different configuration than the first pair. One of the pairs is closer to an apex of the cover than is the other pair. In some implementations the faces of a pair converge toward each other to define a groove there between, with each face being circular and being parallel to a periphery of the cover.

In still another aspect, a cover for a skylight includes a transparent body having an outer surface, an inner surface, an apex, and an open periphery opposed to the apex. The body is formed with a first pair of opposed converging faces that define a first cross-sectional shape. Also, the body is formed with a second pair of opposed converging faces that define a second cross-sectional shape which is different than the first shape, with one pair of faces being closer to the apex than the other pair.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a perspective view of a non-limiting cover;

FIG. 3 is a side view of the cover on a tube, schematically showing sunlight rays at a low angle as might occur early and late in the day;

FIG. 4 is a side view of the cover showing the shape of the transverse cross-section of the grooves in detail circle "B" in FIG. 3;

FIG. 5 is a side view of the cover showing the shape of the transverse cross-section of the grooves in detail circle "A" in FIG. 3;

DETAILED DESCRIPTION OF THE PREFERRED EMBODIMENT

Figure 1:
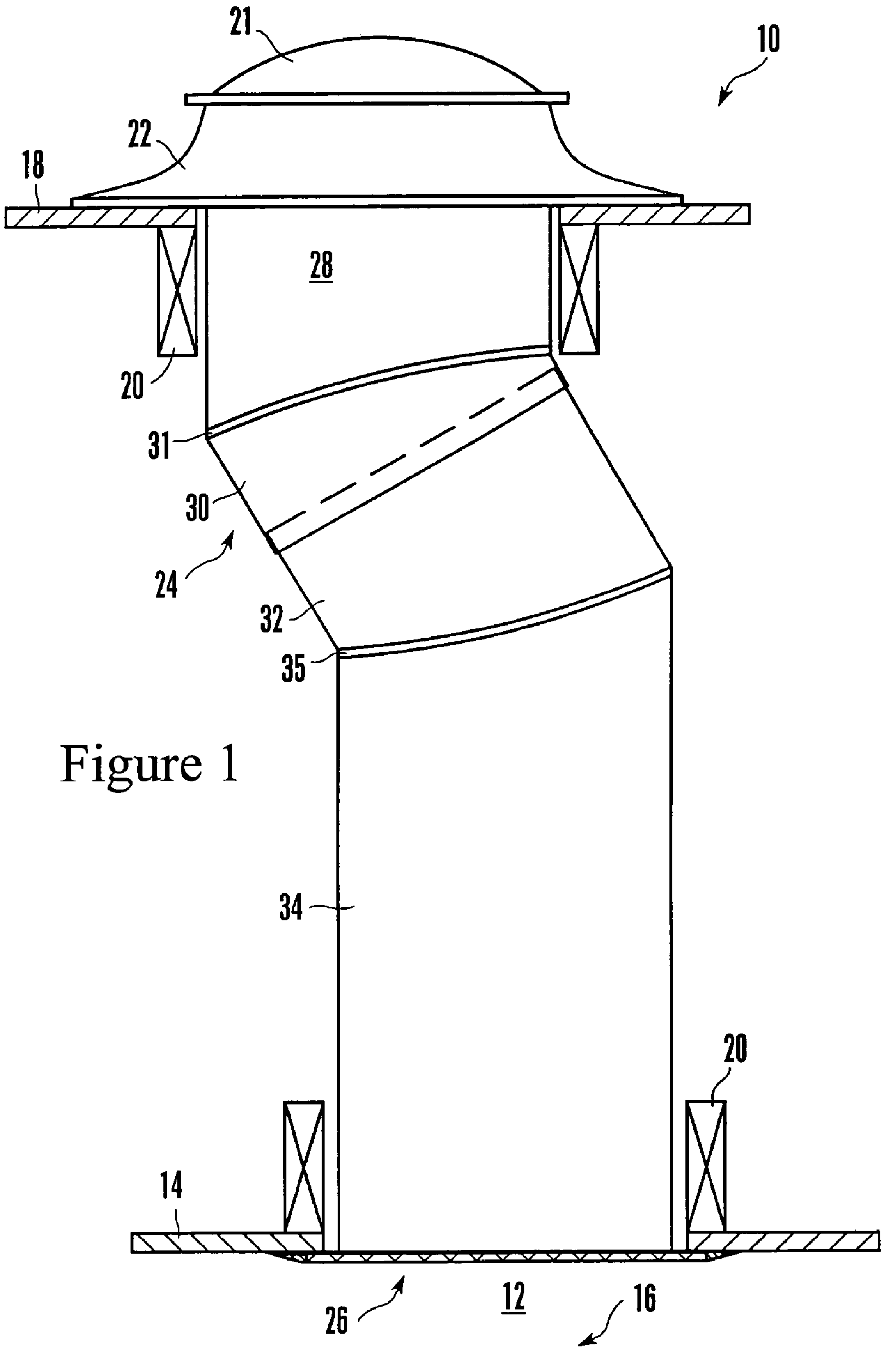
FIG. 1 is a side view in partial cross-section of a tubular skylight.

Referring initially to FIG. 1, an exemplary non-limiting tubular skylight made in accordance with the present invention is shown, generally designated 10, for lighting, with natural sunlight, an interior room 12 having a ceiling surface 14, e.g., drywall, acoustic tile, etc., in a building, generally designated 16. FIG. 1 shows that the building 16 has a roof 18 and one or more joists 20 that support the roof 18 and ceiling surface 14.

As shown in FIG. 1, the skylight 10 includes a rigid hard plastic roof-mounted cover 21 that can be made of, e.g., acrylic or polycarbonate or glass. The cover 21 is optically transmissive and preferably is transparent, and details concerning it are discussed further below.

The cover 21 may be mounted to the roof 18 by means of a ring-like metal flashing 22 that is attached to the roof 18 by means well-known in the art. The metal flashing 22 can, be angled as appropriate for the cant of the roof 18 to engage and hold the cover 21 in the generally vertically upright orientation shown.

As further shown in FIG. 1, an internally reflective metal tube assembly, generally designated 24, depends down from the cover 21. The assembly 24 may be connected to the flashing 22. The tube assembly 24 extends to the ceiling 14 of the interior room 12. In some embodiments the tube assembly 24 directs light that enters the tube assembly 24 downwardly to a light diffuser assembly, generally designated 26, that is disposed in the room 12 and that is mounted to the ceiling 14 or to a joist 20.

The tube assembly 24 can be made of a metal such as an alloy of aluminum, or the tube assembly 24 can be made of fiber or plastic or other appropriate material. The interior of the tube assembly 24 can be rendered reflective by means of, e.g., electroplating, anodizing, metalized plastic film coating, or other suitable means. In one non-limiting embodiment, the tube assembly 24 is rendered internally reflective by laminating the inside surface of the tube assembly with a multi-ply polymeric film made by Minnesota Mining and Manufacturing (3M). A single ply of such film is transparent, but when hundreds of layers are positioned flush together and then laminated to the interior surface of the tube assembly 24, the combination is highly reflective.

In one embodiment, the tube assembly 24 may be established by a single tube. However, as shown in FIG. 1, if desired, in non-limiting implementations the tube assembly 24 can include multiple segments, each one of which is internally reflective. Specifically, the tube assembly 24 can include an upper tube 28 that is engaged with the flashing 22 and that is covered by the cover 21. Also, the tube assembly 24 can include an upper intermediate tube 30 that is contiguous to the upper tube 28 and that can be angled relative thereto at an elbow 31 if desired. Moreover, the tube assembly 24 can include a lower intermediate tube 32 that is slidably engaged with the upper intermediate tube 30 for absorbing thermal stresses in the tube assembly 24. And, a lower tube 34 can be contiguous to the lower intermediate tube 32 and join the lower intermediate tube 32 at an elbow 35, with the bottom of the lower tube 34 being covered by the diffuser assembly 26. The elbow 35 is angled as appropriate for the building 16 such that the tube assembly 24 connects the roof-mounted cover 21 to the ceiling-mounted diffuser assembly 26. It is to be understood that where appropriate, certain joints between tubes can be covered with tape in accordance with principles known in the art.

Now referring to FIG. 2, as shown the cover 21 can be generally hemispherical-shaped and can define a closed apex 40 and an open, generally circular periphery 42 opposite the apex 40. It is to be understood, however, that the cover alternatively can be designed in the shape of a cylinder with straight sides and a flat or curved top. It can be configured to have a continuous curved shape or a series of curved and flat sides. Accordingly, while the periphery 42 shown in FIG. 2 is circular, it alternatively may be elliptical, rectangular, or multi-sided.

FIG. 2 shows that a prismatic pattern is formed on the cover 21, preferably by molding it into the inside surface of the cover 21, although in less preferred embodiments the prism can be in the outside surface. As set forth in greater detail below, in one embodiment the prisms can be established by circular grooves 44 that are parallel to the periphery 42 and that are defined by opposed faces that preferably are flat in transverse cross-section, although in some embodiments they can be curved in transverse cross-section. As disclosed further below, the grooves 44 can vary in depth and pitch. While FIG. 2 shows that each groove is completely circular and that the entire inside surface of the cover is scored with grooves, the grooves 44 may be partially circular and/or may not extend throughout the height of the cover, i.e., the prisms can cover the entire cover or only a portion of it. Further, while the grooves 44 are shown oriented as lines of latitude, they may be oriented otherwise, e.g., as lines of longitude, with each groove in that case varying throughout its length as appropriate in pitch and/or depth and/or cross-sectional shape in accordance with principles set forth further below. In any case, if desired, as shown in FIG. 3, for increased performance the diameter of the cover at the periphery 42 can range from 100% to 150% or more of the tube outer diameter, and the cover height can range from a minimum of 26% or less of the tube diameter to a maximum of 100% or more of the tube outer diameter. Thus, the inside edge of the periphery 42 may be radially spaced from the outside surface of the tube.

Returning to the prisms, in accordance with present principles the cover 21 is formed with a variable prism that directs low-angle light into the skylight tube 24 and that reflects away some high-angle light, to achieve a more constant light output over the course of the day. In terms of the exemplary non-limiting implementation shown in FIG. 2, grooves 44 nearer the apex 40 of the cover have cross-sections that are different than cross-sections of grooves 44 nearer the periphery 42. The grooves 44 may be defined by opposing faces 46, 48.

In cross-reference to FIGS. 3-5, low angle light (e.g., 20°) entering the dome is reflected downward by the planar outer surface due to the incident angle difference and air-to-polymer index differential.

As shown in FIGS. 3-5, sunlight may enter the cover from low angles during the early morning and evening, e.g., at a solar altitude of 20° relative to horizontal. Table 1 below provides a tabulation of non-limiting prism configurations related to this example. (Note: angles are referenced from horizontal unless otherwise noted).

TABLE 1

| Cover Section | exterior surface angle "α" of cover (degrees) | light angle "β" after non-prism refraction through cover outer surface (degrees) | prism angle "γ" (from vertical) of lower prism face (degrees) | add'l refraction "δ" through prism face (degrees) | total direction change of light beam (degrees) |
|---|---|---|---|---|---|
| B (FIG. 4) | 61 | 23 (3° refraction) | 10 | 4 | 7 |
| A (FIG. 5) | 22.5 | 38 (18° refract) | 20 | 7 | 25 |

With the above table in mind and looking at FIGS. 3-5, it may now be appreciated that in the exemplary embodiment shown for illustration virtually all of the low angle sunlight entering the upper portion of the cover, i.e., at detail "A", absent the present invention would propagate through the cover without entering the tube, but with the prism arrangement shown enters the tube, thereby increasing the effective aperture of the tube. Moreover, owing to the non-limiting configuration of the prisms shown herein, reflection losses in the tube and transmission losses in the diffuser are reduced at low solar elevations. Specifically, as understood herein reducing the incident angle to the surface of the tube opening reduces the number of reflections going down the tube.

Figure 6:
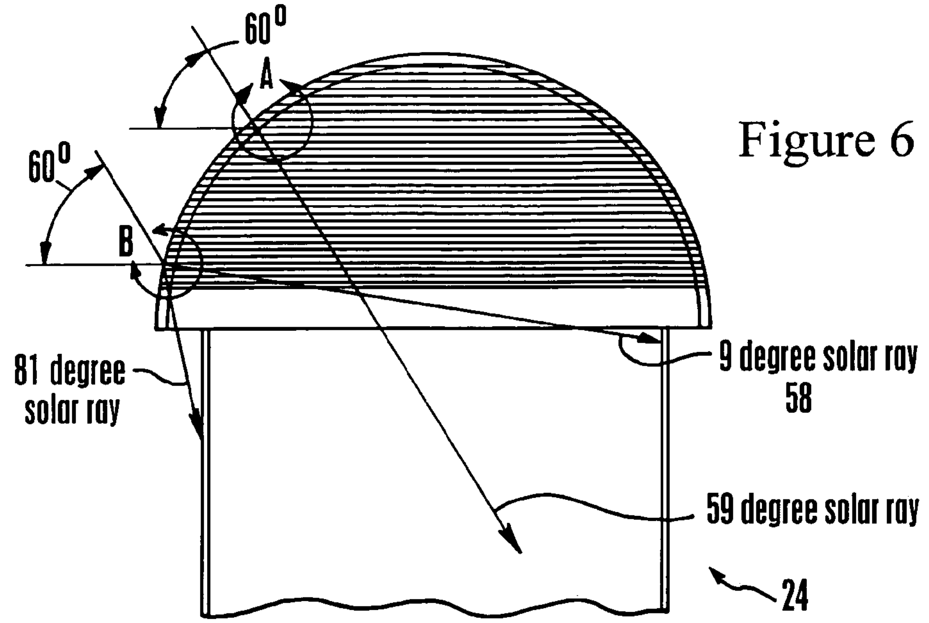
FIG. 6 is a side view of the cover on a tube, schematically showing sunlight rays at a high angle as might occur during midday.
Figure 7:
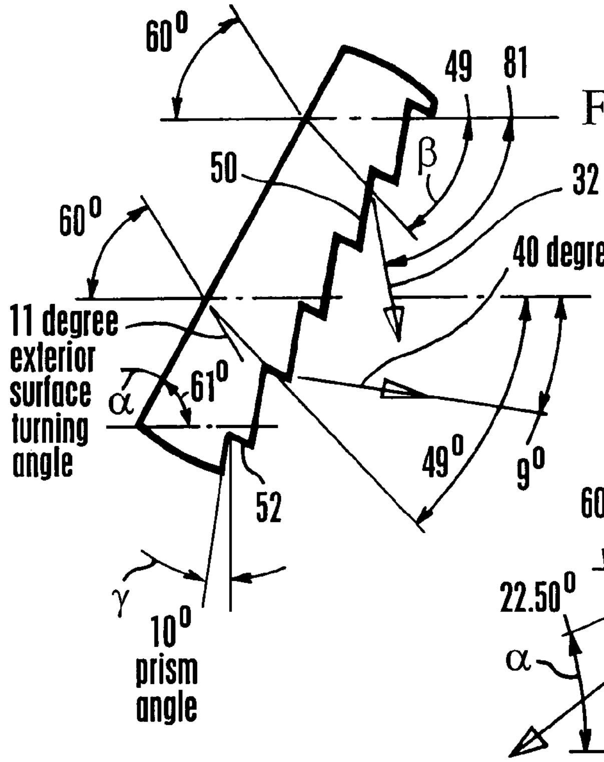
FIG. 7 is a side view of the cover showing the shape of the transverse cross-section of the grooves in detail circle "B" in FIG. 6.
Figure 8:
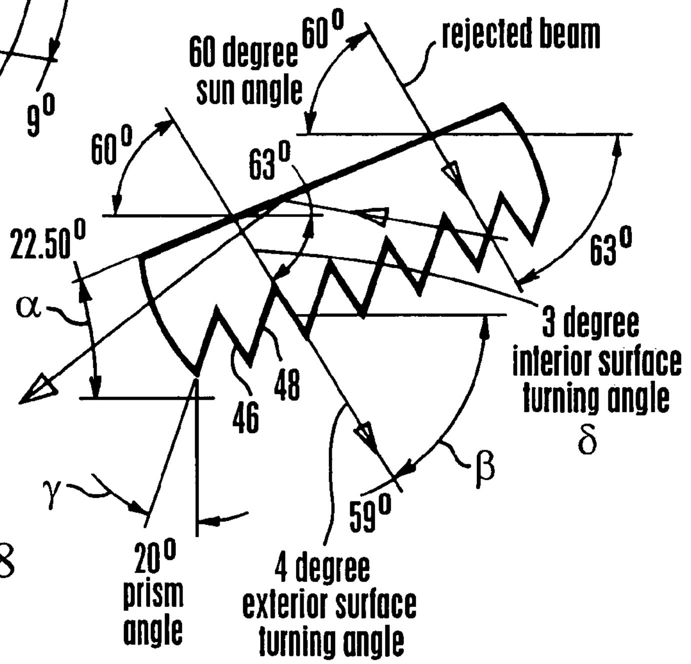
FIG. 8 is a side view of the cover showing the shape of the transverse cross-section of the grooves in detail circle "A" in FIG. 6.

Turning to FIG. 6-8, which shows sunlight entering the cover at high angles (e.g., sixty degrees) as might occur at midday, the light entrance angle β at higher sunlight angles changes significantly due the higher angles and outer cover surface refraction. It should be noted that grooves 44 nearer the apex 40 may be defined by opposing faces 46, 48 that may converge with each other and that may have approximately the same length as each other, roughly defining the sides of equilateral triangle. In contrast, grooves 44 nearer the periphery 42 may be defined by respective long and short faces 50, 52, with the long face essentially defining the hypotenuse of a right triangle and the short face defining the base and being oriented generally perpendicularly to the outer surface of the cover.

In FIG. 7, light is refracted at long face 50 at a sharp angle, downward to the outside of the tube. In contrast, the light entrance angle at short face 52 exceeds the critical angle of refraction and totally internally reflects (TIR) at a shallow angle in the tube. In FIG. 8, entering light nearer the apex of the dome is TIR by both faces 46, 48 with the result being that the light is both directed down into the tube (at 46) and rejected (at 48).

The cover is designed to efficiently refract light down to the tube opening from solar altitudes of 10°-50°. Above 50° the external surface and prism face angles can be established to reflect away from the tube or refract light down the tube at a series of angles, as shown best in FIGS. 7 and 8. This reduction of sunlight capture efficiency compensates for the increased effective area and sunlight intensity related to the high solar angles to maintain an average illumination of the interior. The multiple angles of light also eliminate the glare, hot spots and chromatic aberrations associated with intense direct sunlight. This also greatly reduces the risk of fire associated with combustible materials left inside a tube at the focal points in the tube. While only two discrete groove cross-sections "A" and "B" are shown for simplicity, it is to be understood that the groove cross-sections may incrementally change, groove to groove, from the configuration shown in FIG. 4 to the configuration shown in FIG. 5.

While the particular TUBULAR SKYLIGHT DOME WITH VARIABLE PRISM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for" or, in the case of a method claim, the element is recited as a "step" instead instead of an "act". Absent express definitions herein, claim terms are to be given all ordinary and accustomed meanings that are not irreconcilable with the present specification and file history.

What is claimed is:

1. A tubular skylight, comprising:

a transparent cover defining an apex and a wall depending down from the apex to terminate at an open periphery; and a skylight tube depending downwardly from the cover, wherein the cover is formed with a variable prism that directs relatively lower-angle light into the skylight tube and that reflects away some relatively higher-angle light, to achieve a more constant light output over the course of the day, the variable prism including grooves at least some of which define completely closed circles, wherein the prism is established by a series of circular parallel grooves, wherein the cross-section of at least one first groove nearer the apex defines successive faces of approximately the same length and the cross-section of at least one second groove nearer the periphery defines successive long and short faces, the first and second grooves being located between the apex and the periphery.

2. The skylight of claim 1, wherein the cover is made of acrylic or polycarbonate or glass and is transparent.

3. The skylight of claim 1, wherein the prism is molded into the inside surface of the cover.

4. The skylight of claim 1, comprising a flashing coupling the cover to the tube.

5. The skylight of claim 1, wherein non-prism portions of the cover refract light at a first angle and the prism refracts light at a second angle.

6. The skylight of claim 1, wherein the short faces are oriented generally perpendicularly to the outer surface of the cover.

7. The skylight of claim 1, wherein an inside edge of a bottom periphery of the cover is radially spaced from an outside surface of the tube.

8. A lighting system comprising:

a transparent skylight cover;

a light diffuser; and a tubular structure extendable between the cover and diffuser, wherein the cover is formed with a first pair of prism faces and a second pair of prism faces having a different configuration than the first pair, one of the pairs being closer to an apex of the cover than is the other pair, each pair of prism faces establishing a constant angle and configuration throughout the length of the pair, a pair of faces nearer the apex being of approximately the same length as each other and a pair of faces nearer an open periphery of the cover comprising one long and one short face, both pair being between the apex and the periphery.

9. The system of claim 8, wherein the faces of a pair converge toward each other, each face being circular and being parallel to a periphery of the cover.

10. The system of claim 8, wherein the cover is made of acrylic or polycarbonate or glass and is transparent.

11. The system of claim 8, wherein the pairs are made in the inside surface of the cover by molding.

12. The system of claim 8, comprising a flashing coupling the cover to the tubular structure.

13. The system of claim 8, wherein non-prism portions of the cover refract light at a first angle and the pairs refract light at a second angle.

14. The system of claim 8, wherein each pair defines a groove, and wherein the cross-section of at least one groove nearer the apex defines successive faces of approximately the same length and the cross-section of at least one groove nearer the periphery defines successive long and short faces.

15. The system of claim 14, wherein the short faces are oriented generally perpendicularly to the outer surface of the cover.

16. The system of claim 8, wherein an inside edge of a bottom periphery of the cover is radially spaced from an outside surface of the tubular structure.

17. A skylight, comprising:

a cover having a transparent body having an outer surface, an inner surface, an apex and a wall, the wall not having any flat portion and depending down from the apex to terminate at a lower edge in an open periphery, the body being formed with a first pair of opposed converging faces, the body being formed between the apex and periphery with a second pair of opposed converging faces, the first pair being closer to the apex than the second pair, each pair being parallel to the open periphery, the first pair having faces of approximately equal length, the second pair having a short face and a long face; and a skylight tube coupled to the cover.

18. The skylight of claim 17, wherein the faces are circular.

* * * * *